May 9, 1939.  E. L. MAYO  2,157,770
THERMOSTAT AND METHOD OF MOUNTING THE SAME
Filed May 28, 1936  2 Sheets-Sheet 1
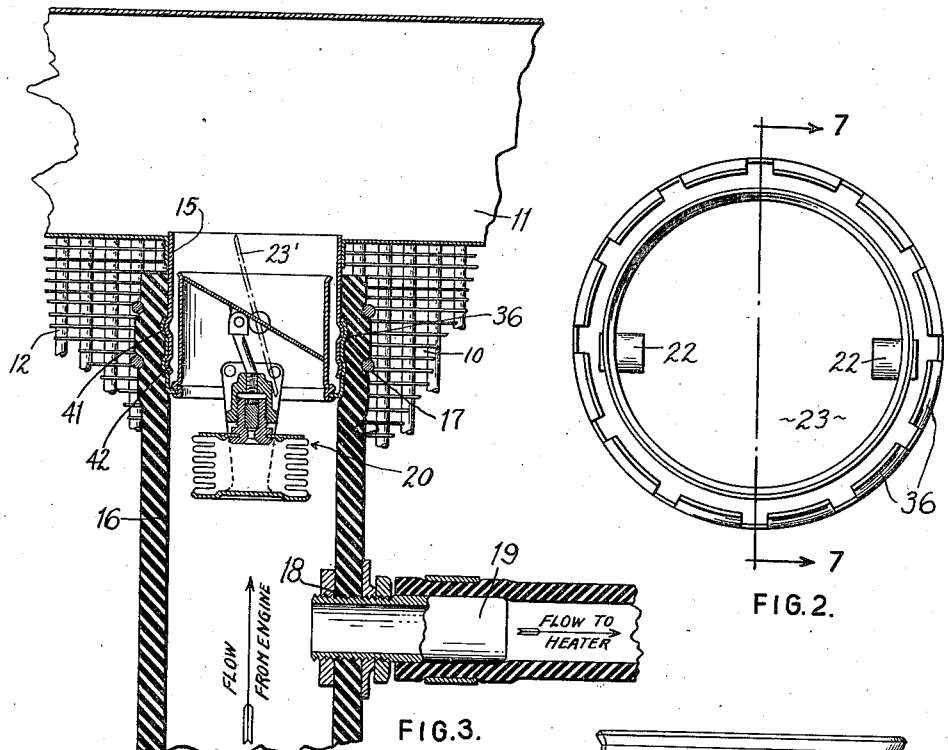
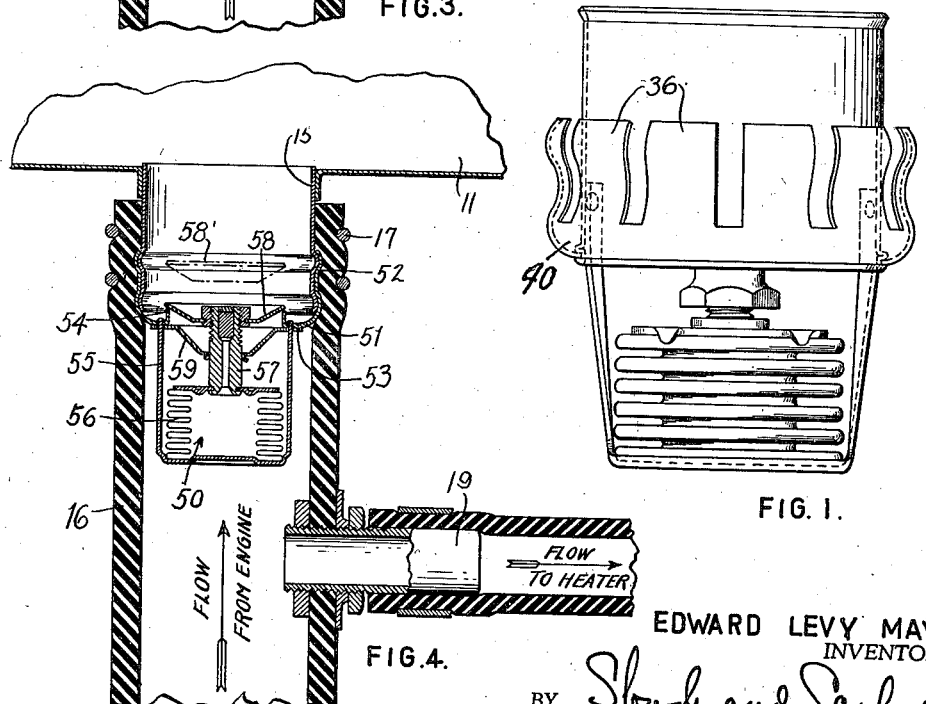
EDWARD LEVY MAYO
INVENTOR.
BY Slough and Sanfield
His ATTORNEYs

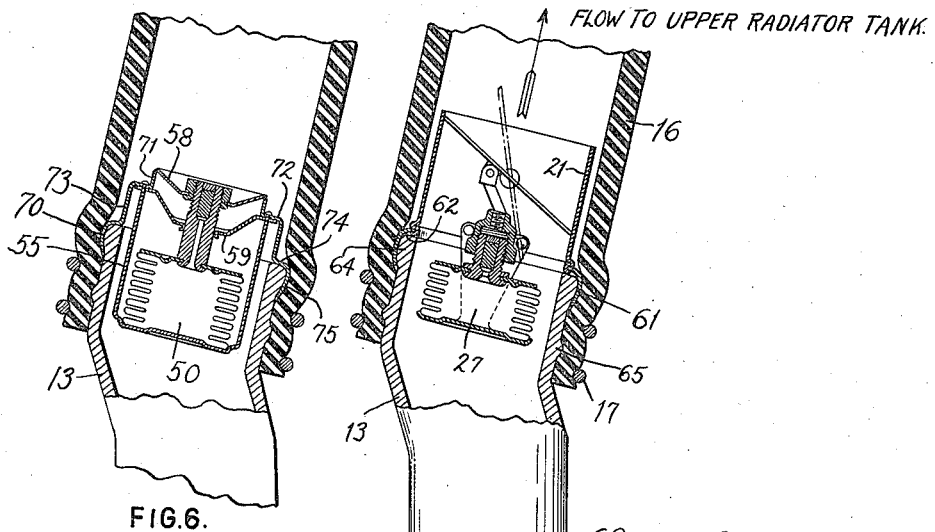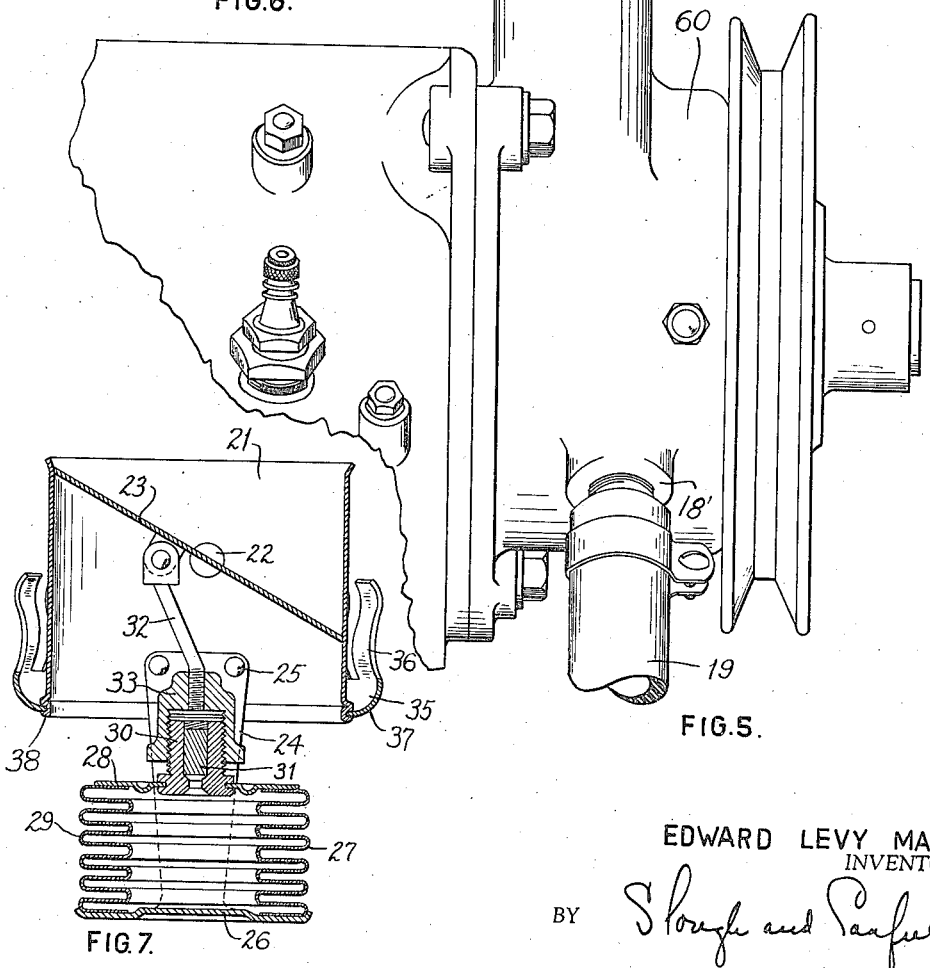

Patented May 9, 1939

2,157,770

UNITED STATES PATENT OFFICE 2,157,770

THERMOSTAT AND METHOD OF MOUNTING THE SAME

Edward Levy Mayo, Cleveland, Ohio, assignor to The Bishop & Babcock Manufacturing Company, Cleveland, Ohio, a corporation of Ohio Application May 28, 1936, Serial No. 82,235

1 Claim. (Cl. 236—34)

This invention relates to thermostatic valves and more particularly to such valves as are employed in connection with the cooling system of internal combustion engines of automotive vehicles and the like.

Numerous motor vehicles in use at the present time are not provided with and no provision has been made for a thermostatically controlled valve regulating the temperature of the cooling fluid in the engine. The present invention has particular application to this class of motor vehicles in that it provides a thermostatically controlled valve that may be easily applied to such vehicles without necessitating the change or alteration of any part, as received by the purchaser. Furthermore, a construction is provided which will not materially lessen the previous free flow of water through the cooling system when the valve is open.

Although the present invention is particularly adaptable to such class of motor vehicles, it is understood that it is not to be restricted in its application to so-called "service installation", since it is equally well adapted to installation as original equipment for constructions which are intentionally formed during manufacture for its provision in the cooling system.

Heretofore, when applying a thermostatic valve in the engine cooling system of a vehicle it has been common practice to sever a section of the hose connection leading from the motor block to the radiator and install the valve by uniting each end with the severed hose ends. Other installations required supplemental housings when securing the valve at the motor block or water header of the radiator. In the first instance, if the valve was removed for any reason without immediate replacement it was necessary to provide a new hose or conduit connection due to the severed section.

It is an object of my invention, therefore, to provide a thermostatically controlled valve for the cooling systems of internal combustion engines which may be applied to such systems without change or alteration of parts of the system.

Another object of my invention is to provide a thermostatically controlled valve adapted to regulate the temperature of the cooling liquid of an internal combustion engine, which can be quickly and easily applied to such a system as a "service installation."

Another object of my invention is to provide a thermostatically controlled valve for the cooling systems of internal combustion engines, which will not materially impede the free flow of the cooling liquid when the valve is in open position.

Another object of my invention is to provide a valve of the above type adapted to be inserted in the water connection between the engine and the radiator and maintained positioned therein by the usual hose connection therebetween.

Another object of my invention is the provision of a simple means for securing a thermostatically controlled valve within the water passage connecting the engine and radiator water header of a motor vehicle.

Another object of my invention is the provision of a valve of the above type which is relatively inexpensive to manufacture and install.

Other objects of my invention and the invention itself will become increasingly apparent from a consideration of the following description and drawings, wherein:

Fig. 1 is an elevational view of a thermostatic valve embodying my invention;

Fig. 2 is a plan view of the valve illustrated in Fig. 1;

Fig. 3 illustrates the valve of Figs. 1 and 2 as applied to the radiator inlet fitting of an internal combustion engine;

Fig. 4 is a view similar to Fig. 3, illustrating another embodiment of my invention, wherein a poppet type valve is employed;

Fig. 5 is a fragmentary elevational view partly in section, showing a further modification of my invention wherein a butterfly type valve is applied to the motor block outlet of an internal combustion engine;

Fig. 6 is a view generally similar to Fig. 5, but wherein a poppet type valve is employed; and Fig. 7 is a sectional view taken along the line 7—7 of Fig. 2.

Referring now to the drawings, I have indicated generally at 10 the radiator of an internal combustion engine provided with the usual water header 11 concealed within the upper portion of the radiator shell. The header 11 is connected in the usual manner by a plurality of tubes 12 to a cooperating lower water header, not shown, which is connected by suitable conduit means to the engine. The engine is provided with a water outlet connection 13, best illustrated in Fig. 5, the water outlet connection 13 of the engine being connected with the inlet connection indicated at 15, for the upper water header by means of a flexible conduit 16.

Motor vehicles not originally equipped with thermostatically controlled valves have the lowermost end of the conduit 16 telescoped over the water outlet connection 13 and the uppermost end of the conduit telescoped over a depending annular flange forming the inlet connection for the water header 11, the conduit ends being secured by encircling clamps 17.

The flexible conduit 16, which is usually formed of rubber, may be perforated as indicated at 18, and sealingly connected to a conduit 19 leading to the inlet of a heater for the passenger compartment of the vehicle.

Formerly it was customary to provide a lateral outlet in the thermostatic valve to effect the flow of heated water to the heater, but today most cars are provided with a tapped hole as indicated at 18', Fig. 5, which is plugged until such time as a heater is required. The conduit 19 in these cars may be directly connected at this point without requiring the conduit 16 to be perforated for this purpose. It has also been customary on cars not originally provided with a plugged connection, such as 18', to tap the pump housing at this point or the motor block at a suitable point. For these reasons it is no longer necessary to provide thermostatic valves for cooling systems with a by-pass connection to the vehicle heater.

The return from the heater to the radiator is effected in the usual manner, but since these parts constitute no essential part of my invention and may be omitted if desired, further description or illustration is not believed necessary.

I have indicated generally at 20 a thermostatic valve which in this embodiment is of the butterfly type, as best illustrated in Fig. 7, and comprises a tubular element 21 provided with trunnions 22 forming a pivotal mounting for a butterfly valve element 23. A generally U-shaped stirrup 24 is secured by its upstanding ends to the tubular element 21 in any suitable manner, as by rivets 25. The base of the stirrup 24 is of circular form and provides a fixed head 26 for a bellows, generally indicated at 27.

The bellows 27 comprises the fixed head 26, and a movable head 28 interconnected by a corrugated flexible tube 29 sealingly secured to the heads 26 and 28. The upper movable head 28 is perforated for the reception of an externally threaded cap 30 through which a heat responsive fluid is introduced into the bellows and sealed therein by a plug element 31.

A link arm 32 is pivotally secured to the butterfly valve element 23 at its upper end and at its lower end is adjustably connected to the cap 30 by means of a nut 33.

It will now be understood that in response to variations of temperature externally of the bellows 27, that movement will be communicated to the butterfly valve element 23 above a predetermined temperature at which the valve element remains closed.

An annular clamp 35 comprising a plurality of upstanding resilient fingers 36 is provided with a radially inwardly directed flange 37 which is disposed against a shoulder provided on the tubular element 21 and clamped thereagainst by spinning over the end of the tubular element 21, as indicated at 38.

The installation of the valve as a "service installation" will now be described. The uppermost end of the conduit 16 is removed from the inlet connection 15 of the upper water header 11 through loosening of the clamps 17 and the valve is forced within the upper portion of the flexible conduit 16 with the resilient fingers 36 abutting the inner walls of the conduit. The inlet 15 to the upper water header of the radiator includes an integrally secured tubular element 40 having an outer diameter approximating the inner diameter of the conduit and corrugated to form spaced annular shoulders, as indicated at 41 and 42. The upper end of the conduit 16 is forced over the element 40 and forces the resilient fingers 36 of the valve outwardly into wedging engagement with the inner walls of the conduit. The fingers 36 are grooved to receive the shoulders 42 and 41 respectively of the element 40 when a predetermined inward position is reached. Thus, the valve is locked tightly within the upper end of the conduit and, due to the wedging engagement of the element 40 with the fingers 36 which in turn are embedded in the conduit inner walls, a fluid-tight seal is effected. The co-operating grooves in the fingers 36 and shoulders 42 and 41 of the element 40 aid considerably in maintaining such a seal. The lowermost end of the element 40 is crimped radially inwardly to facilitate forcing element 40 into its assembled position.

It will now be understood that the valve may be inserted into the conduit without any alteration of the parts comprising the vehicle cooling system in a relatively quick and simple manner. The clamps 17 are then tightened to supplement the pressure between the conduit, the fingers 36 and element 40. The element 40, welded or otherwise suitably secured to the depending annular flange forming inlet 15 projects downwardly a sufficient amount so that it may be telescoped by a substantial length of the conduit 16 above shoulder 41 and maintained tightly engaged therewith by the upper encircling clamp 17.

The open position of the butterfly valve element 23, is indicated at 23' and it will be observed that little restriction to liquid flow is offered by the structure.

Although I have described mounting of the valve as a "service installation", it will be readily understood that it is equally applicable as an original equipment installation, or when the cooling system is initially designed for a thermostatic valve of this type.

Referring now to Fig. 4, I have illustrated a modification of my invention generally similar to that above described wherein a poppet type of thermostatically operated valve, generally indicated at 50, is provided. In this construction an annular clamp member 51 is provided with a plurality of resilient upstanding fingers 52 integral with a radially inwardly extending flange 53 flared upwardly at its inner periphery to form an annular valve seat 54. The clamp 51 has secured thereto a stirrup 55 which supports a bellows 56 generally similar to that previously described. Secured to the upper or movable head of the bellows 56 is a stem 57 to which is adjustably secured a generally cup-shaped valve element 58. A guide member 59 comprises a relatively narrow annulus slidably encircling the sleeve 57 and from which extend a plurality of arms, such as three, by which the guide element is supportingly secured to the clamp 51. The valve element 50 is mounted within the conduit 16 as previously described by first forcing the valve 50 within the upper end of the conduit and subsequently telescoping the lower portion of the element 40 within the fingers 52 and tightening the clamp 17. It will be understood that when the temperature of the cooling water rises above a pre-determined value, the expansion of the bellows 56 will force the valve element 58 from the valve seat 54 to some elevated position such as indicated at 58' permitting the passage of the water to the radiator.

Referring now to Fig. 5, I have illustrated a portion of the motor block forming a mounting for a water pump generally indicated at 60, the pump being provided with a generally tubular water outlet fitting 13 previously described. Although for purposes of illustration I have shown a pump in the liquid circulatory system for the engine, it is understood that my invention is equally applicable to a thermo-syphonic system. In this arrangement, the valve portion is similar to the valve described in connection with Figs. 1 to 3 inclusive, with the exception that the annular clamp member 35 is replaced by a clamp member 61 of somewhat different form.

The clamp member 61 is generally tubular in form and provided with a radially inwardly directed flange 62, whereby it may be tightly secured to the tubular element 21 by spinning over the lowermost end of the element 21 to form a tongue and groove connection between the clamp member and the tube 21. Radially outwardly, the flange 62 terminates in an arcuate shoulder facilitating insertion of the valve within the lowermost end of the conduit 16, and the portion of the clamp depending from the said arcuate shoulder is slotted at circumferentially spaced points to render this portion relatively resilient for a purpose to be later described.

This method of installing the valve will now be described. Assuming this to be a "service installation", the lowermost end of the rubber or the like flexible conduit 16 will be disengaged from the outlet 13 through loosening of the clamps 17 which will permit the resilient slotted portion of the clamp member 61 to be forced over an enlarged end 64 of the outlet 13 with the lowermost end of the element 21 seating upon the end face of the outlet 13, to form a secure mounting for the valve, with the bellows disposed within the outlet 13 proper.

The lower end of the conduit 16 is then forced over the clamp member 61 and the end portion of the outlet 13 a sufficient distance to ride over an annular shoulder 65 spaced from the end of the outlet. The clamps 17 encircling the end of the conduit 16 are then tightened on either side of the shoulder 65, effecting a tight seal between the valve, the conduit 16, and the outlet 13.

It will be observed that the raised end portion 64 and the shoulder 65 of the outlet effects a double corrugation of the conduit 16, insuring a tightly sealed connection in this zone.

Referring now to Fig. 6, I have illustrated a modification of my invention wherein a valve 50, similar to that described in connection with Fig. 4, is inserted at the outlet connection 13 of the motor block, the construction being similar to Fig. 4 with the exception that the clamp element 51 is replaced by a clamp element 70. The clamp element 70 is of generally tubular construction comprising an auxiliary extending annular flange 71 at its uppermost end forming a valve seat for the valve element 58, the annular flange 71 being connected by a radially extending flange portion 72 with an enlarged intermediate tubular portion 73 provided with a radially extending flange 74 merged with a slotted end portion 75 by means of an arcuate annular shoulder. The radially extending flange portion 72 forms a support for the stirrup 55 and the spaced arms of the guide element 59. To install the valve, the lower end of the conduit 16 is disengaged from the outlet 13, as previously described, and the slotted resilient portion of the clamp member 70 is forced over the enlarged shoulder portion 64 of the outlet 13 to tightly grip the same against axial displacement.

The conduit end is then telescoped over the tubular outlet 13 and sealingly secured therewith by tightening the encircling clamps 17 which further wedges the clamp 70 against the cooperating portion of outlet 13.

It will now be understood that the thermostatic valve controlling liquid flow in the circulatory system of the engine may be installed either at the water outlet from the motor block or at the water inlet for the upper water header of the radiator in a simple, quick, and efficient manner, as a "service installation". Further, the valve may be installed as original equipment or in vehicles wherein provision was originally made for such a valve in essentially the same manner.

Although I have shown and described modifications of my invention, I contemplate that numerous and extensive departures may be made therefrom without departing from the spirit of my invention and the scope of the appended claim.

Having thus described my invention, what I claim is:

The combination with a thermostatically controlled valve adapted to be disposed within relatively telescoping cooperating conduit parts of a fluid circulatory system, the valve including a generally tubular element forming a valve seat, of an annular generally axially extending flange secured to the tubular element by radially inwardly extending portions, the flange being slotted at spaced circumferential portions permitting the flange to be forced over the smaller of the conduit parts to constrictingly engage the same, the flange also being provided with radially extending shoulder portions adapted to abut portions of the smaller conduit part to maintain the valve against relative axial movement when the smaller conduit part and the flange are projected within the larger conduit part.

EDWARD LEVY MAYO.